July 15, 1958 E. C. RICKER 2,843,295

POWDER CLOUD GENERATOR

Filed Feb. 18, 1955 2 Sheets-Sheet 1

INVENTOR.
EUGENE C. RICKER

BY Frank A. Steinhilper

ATTORNEY

July 15, 1958 E. C. RICKER 2,843,295

POWDER CLOUD GENERATOR

Filed Feb. 18, 1955 2 Sheets-Sheet 2

INVENTOR.
EUGENE C. RICKER
BY Frank A. Steinhilper
ATTORNEY

United States Patent Office 2,843,295

Patented July 15, 1958

2,843,295

POWDER CLOUD GENERATOR

Eugene C. Ricker, Columbus, Ohio, assignor, by mesne assignments, to Haloid Xerox Inc., a corporation of New York Application February 18, 1955, Serial No. 489,249

6 Claims. (Cl. 222—189)

This invention relates in general to xerography and in particular to development of electrostatic charge patterns.

In xerography an image pattern of electric charges is formed on a xerographic plate by exposing a sensitive plate to a light image or light pattern. A surface of the plate is composed of a photosensitive material that reacts to light by changing its electrical resistance characteristics. The plate is made sensitive by placing on this surface, which is electrically insulating in darkness, a uniform electrostatic charge. The sensitive plate, when exposed to a light pattern, dissipates charges where light strikes the plate. Dissipation of charge results due to an increase in conductivity or a decrease in the insulating characteristics of areas of the plate struck by light. Insulating characteristics of the plate are not affected where areas of blackness or no light reach the plate surface, and these areas continue to hold electrostatic charges. Exposing then, to a light pattern, results in substantially complete discharge in areas where light strikes, but no discharge where no light strikes. Areas projected to the surface of a sensitive xerographic plate which are between the extremes of no light and intense or full light result in proportional reductions of electrostatic charge on the photosensitive surface of the plate. The resultant pattern of electric charges following exposure of the sensitive plate to a projected light image is one where substantially no charges exist where full light was projected to the surface, original charges continue to exist where no light reached the surface, and charges in direct proportion to the lack of light exist where amounts of light between the extremes of no light and intense light were projected to the surface of the plate. This electric charge pattern, which is often termed in xerography an electrostatic image, may be transferred to another surface or allowed to remain on the plate and may then be developed by bringing into the area of influence of the charge pattern electrostatically charged powder particles. Development is the deposition of powder particles on a surface carrying an electric charge pattern in image configuration which is controlled and attained through the electrostatic charge pattern which results from exposure of a sensitive xerographic plate.

It is an object of this invention to improve upon means and methods for the development of electrostatic images. It is also an object of this invention to improve upon apparatus for the development of electrostatic images.

One form of development of electrostatic images is known as powder cloud development, which involves forming a cloud of electrostatically charged powder particles suspended in air or other gas and supplying this charged powder cloud to the area of influence of the electrostatic latent image.

Generally in powder cloud creating apparatus, there is included a powder source, means to create a cloud of powder in gas, means to convey the cloud to a plate carrying an electrostatic latent image, and means to electrostatically charge the powder in the cloud before it reaches the plate. Such devices, which include one or a number of the above elements and which are used to take powder from a source whether it be a mound of powder or whether it be in other shapes or forms and convert it to an aerosol of powder in gas, is herein and generally in the art referred to as a "powder cloud generator" or as a "cloud generator."

It is an object of this invention to improve the art of xerography by improving powder cloud generators.

It is another object of this invention to provide new means and methods for creating aerosols of powder in gas.

An objective in the art of xerography, as in any art concerned with image reproductions, is that of uniformly developing high quality copy. Means of obtaining this objective in xerography while using powder cloud development is through the uniform and constant presentation to the electrostatic image on a plate surface of a powder cloud of fine developer powder particles uniformly and densely deposited throughout, and accordingly, an object of this invention is to devise means, methods and apparatus to uniformly and constantly present a powder cloud of fine developer particles to a surface.

The use of atomizers and rotating elements which have been known to the art to produce clouds have been found to lack uniformity and density which are desirable characteristics in producing uniform and consistent quality reproductions. A new theory was, therefore, evolved to produce constant clouds of uniform and dense developer powder dispersion by uniformly loading a membrane such as cloth or the like, with developer particles and passing this membrane at a controlled and uniform rate over an output orifice. The resulting device constructed according to this theory consisted of an endless belt supported by and stretched between two cylinders. Raw developer powder or developer powder in bulk form was positioned at the base of the device to a point above one cylinder. The belt was made to move by driving one cylinder and thereby the belt moved through the powder reservoir at the base of the device. An input tube supplied air to the device, and the endless belt was made to move over an output tube. Air flowed through the device and through the belt which became loaded with developer powder when it passed through the powder at the base of the device, blowing both air and powder out the output tube.

This invention improves upon the endless belt disc generator just described. It follows similar theories in that it is concerned with uniformly loading a membrane and uniformly dispersing the powder particles loaded into the membrane in the form of a powder cloud. The device and methods of this invention are capable of delivering more uniform dispersions of powder in air than has heretofore been possible.

It is, therefore, an object of this invention to improve upon powder cloud generators so that a uniform and dense dispersion of particles of powder in gas is created.

It is another object of this invention to improve upon means and methods of creating uniform and dense dispersions of particles of powder in gas.

The objectives of this invention are attained through the use of a porous membrane enclosed in a housing and rotated or moved in substantially a horizontal plane. At one point on the porous membrane is positioned raw or bulk developer powder particles. These particles are held in position by a retaining arm which also acts to meter out a controlled amount of powder to the membrane as it rotates or moves beneath the powder supply and the retaining arm. Air is flowed into the housing at one point and powder in air flows out of an output tube. An output orifice connected to the output tube is positioned to press firmly against the porous membrane, and powder in air is supplied to it as loaded portions of the membrane pass by the output orifice.

And, it is therefore, a further object of this invention to provide a new powder cloud generator in which a portion of a porous membrane rotates or moves through substantially a horizontal plane.

It is yet a further object of this invention to provide new means and methods for generating a powder cloud in which a portion of a porous membrane rotates or moves through substantially a horizontal plane.

For a better understanding of this invention, together with other further objects thereof, reference is now had to the following description taken in connection with the accompanying drawings, and the scope of the invention will be pointed out in the appended claims.

Figure 1:
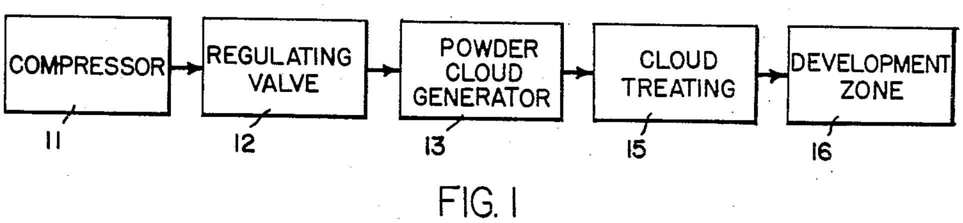
Figure 1 is a block diagram of elements which would generally appear in xerographic cloud creating apparatus for use in developing electrostatic images or electric charge patterns.

Referring now with more particularity to the drawings, in Figure 1 is shown a block diagram of elements which compose cloud creating apparatus for development of electrostatic latent images. As is indicated in this diagram, compressed gas is fed from compressor 11 to a powder cloud generator 13 through a regulating valve 12, and the output of the powder cloud generator is fed through a cloud treating means 15 and then to the development zone 16 whereat electrostatically charged developer particles are passed for development purposes to a surface carrying an electrostatic image.

The source of compressed or pressurized gas may be any suitable source, such as for example, an air pump or like pressure generating member or a suitable pressurized gas container. Such containers are readily available on the commercial market in the form of gas capsules of carbon dioxide or the like under pressure, in the form of bombs or the like of gas such as fluoro-chloroalkanes, which are available under the general family name of Freon. Similarly, a suitable system may comprise a pump or generating means optionally in combination with a pressure chamber whereby fluctuations in pressure may be limited or avoided.

Regulating valve 12 is used to control the rate of flow of gas from compressor 11 to powder cloud generator 13 and also to control the pressure of gas supplied to the powder cloud generator. The powder cloud generator, which is the next block in this diagram following regulating valve 12, is used to create an aerosol of powder in gas. It may be supplied with powder in what may be termed the raw or bulk form, that is, powder taken directly from the container and directly supplied in that form without treatment to a powder cloud generator, or it may be supplied with powder which is first treated and then placed in position in the generator. The particular powder used is dependent on a number of factors, such as other elements used in the cloud creating apparatus, the form of xerographic development, the desired quality of the final copy, and the like. A more detailed discussion of powders will appear below.

The powder treating block or cloud treating means 15 of the diagram appearing in Figure 1 may represent any number of means and apparatus for imparting an electrostatic charge or deagglomerating the individual powder particles in the aerosol supplied from the powder cloud generator. Charging of particles and deagglomeration of particles may be accomplished for example by turbulently flowing them through fine capillary tubes, or charging alone may be accomplished by passing the aerosol of powder in air through a corona discharge zone, or the like.

The aerosol composed of charged particles in gas is next supplied, as indicated by the block diagram, to development zone 16. Generally this zone includes a means for expanding the aerosol to a cloud, and optionally this may be done by leading the air from tubes or the like to a larger area where the aerosol expands, creating the cloud of charged developer particles in gas. It is also feasible and sometimes desirable to use the particles in aerosol form without expansion to create a cloud.

In xerography in order to develop a true copy of the original image, it is generally desirable to develop against gravity, in that the electrostatic charges on the plate surface truly represent the pattern of the image projected to the plate surface, and gravitational forces, if allowed to operate during the deposition of developer particles, may cause distortion in the reproduction. Also, when development is carried out opposite to the pull of gravity, deposition of heavy particles and agglomerates is substantially prevented. One way of avoiding effects of gravitational forces is through the positioning of the plate so that electrostatic charges on the surface of the plate act alone on the charged developer particles. This may be accomplished by positioning the plate with the image bearing surface facing downward and creating a cloud beneath it. In some instances particles deposited because of other forces are removed during the development process through the use of such techniques as directing slight air currents or winds to the plate surface. Such winds or currents are sufficient to remove particles not held in place due to electrostatic forces, but should be limited so that particles electrostatically held in place are not affected.

It is to be understood that many modifications may be made in the apparatus described in connection with the block diagram shown in Figure 1. For example, a device may be inserted between the powder cloud generator and the cloud treating block for purposes of deagglomerating clumps of particles fed in the aerosol from the powder cloud generator. A device may also be inserted between the powder cloud generator and the cloud treating block for purposes of dehumidifying the developer powder particles. Such a device may also be inserted between the charging block and the development zone block. These modifications have been included herein for purposes of demonstrating that the powder cloud creating device shown and described in relation to Figure 1 is for illustrative purposes and is intended to include within its scope modifications and equivalents able to accomplish the purpose of generating a powder cloud for deposition on electric charge patterns.

Figures 2, 3:
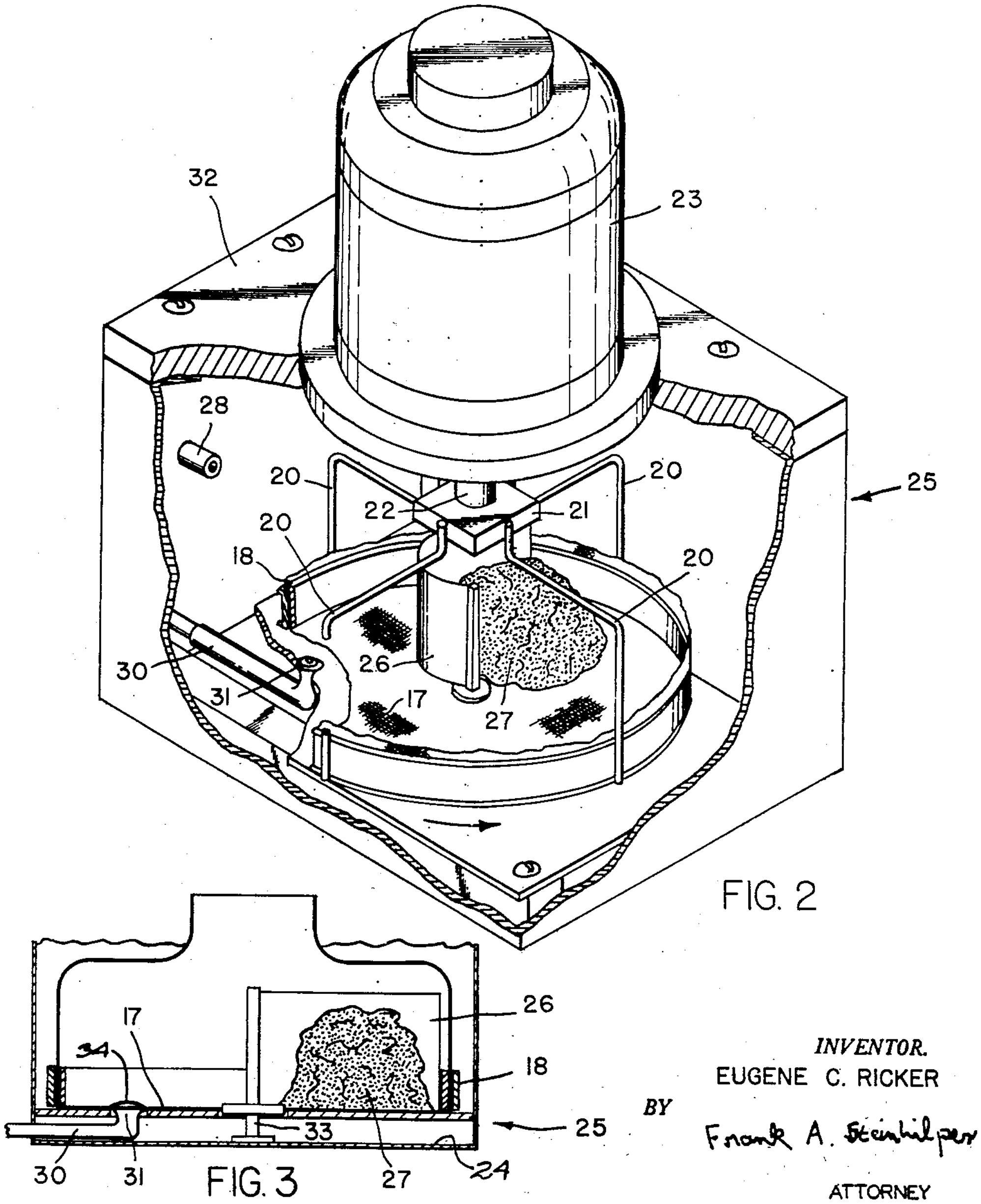
Figure 2 shows an isometric cutaway view of one embodiment of a powder cloud generator contemplated by this invention.
Figure 3 shows a transverse sectional view of the scraper and the output tube as they are positioned in relation to the porous membrane of the embodiment of the cloud generator shown in Figure 2.

Reference is now had to Figure 2, wherein is shown an embodiment of a powder cloud generator according to this invention. In this embodiment a porous membrane 17 is a flat, circular plate or a disc supported and mounted in frames 18. It is to be understood, of course, that other shapes or configurations may be used. The frames 18 are attached through connecting arms 20 to the base 21 of axle 22 of motor 23. A housing 25 encloses the entire apparatus, except a portion of axle 22 and motor 23 which, of course, may also be included within the housing. Positioned at the center of disc 17 and fixedly attached at its base to housing 25 is retaining arm or scraper blade 26. Shown also in this figure is a mound of developer powder 27 positioned against retaining arm 26 and supported by porous membrane 17. Inlet tube 28 projects through housing 25 as does outlet tube 30. Output tube 30 extends to and projects into output orifice 31 positioned to press firmly against porous membrane 17. The top 32 of housing 25 is optionally made of a transparent material to allow viewing of the internal elements and operation of the powder cloud generator. Provisions may also be made to remove top 32 easily and conveniently so that replenishment of developer powder mound 27 is facilitated during operation of the generator shown in this embodiment. It is to be understood, of course, that other arrangements may be made to allow easy access to the internal area of the powder cloud generator shown in this figure, which will occur to those skilled in the art, and which are intended to be included within the scope of this invention.

Reference is now had to Figure 3 wherein is shown in detail the positioning of the output tube and the retaining or scraper arm or blade. Porous membrane 17 is spaced above the floor 24 of housing 25. Positioned beneath membrane 17 is output tube 30 which terminates in output orifice 31 positioned to press firmly against membrane 17. Retaining arm or scraper blade 26 is positioned and mounted to extend outward from the center of disc 17 to support frames 18. Positioned against scraper blade 26 and on membrane 17 is a supply of developer particles 27. Scraper blade 26 is fixedly mounted in position by rod 33 permanently adjoined to housing 25. It is to be understood, of course, that when the membrane is in a form different than the disc of this figure, the retaining arm may be modified to retain powder without extending to the frame at all times. The orifice 31 of outlet tube 30 is surrounded by a button-like fitting 34, which is raised at the center and lowered at the edges and smooth throughout and this fitting is so positioned whether above or beneath the membrane to cause output orifice 31 to extend into and above the plane through which membrane 17 would normally extend at the point of contact between membrane 17 and fitting 31. Retaining arm 26 is positioned so that its bottom edge makes contact with the top surface of membrane 17.

Figure 4:
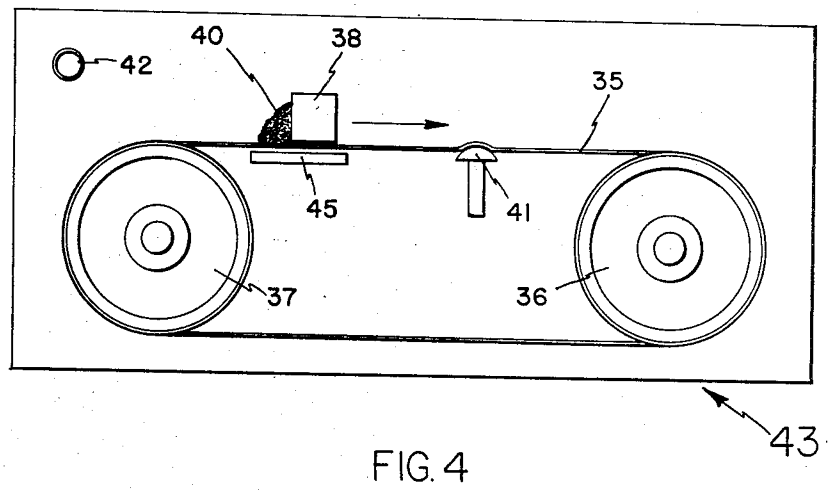
Figure 4 is a transverse sectional view of another embodiment of a cloud generator.

In Figure 4 is shown another embodiment of a powder cloud generator according to this invention. In this figure endless belt 35 is rotated around cylinders 36 and 37. Cylinder 37 is driven by a motor (not shown) and is coated with a friction drive surface, such as a layer of sandpaper or any similar rough material, to cause movement of the belt. Cylinder 36 is positioned in the apparatus to provide free movement and tautness to belt 35 while guiding the belt as it moves. Positioned on the belt is retaining arm 38, which acts to retain powder particles 40 in place as the belt moves beneath and relative thereto while in substantially a horizontal plane. Output tube 41 is mounted to press firmly against the web or belt 35 and supplies the output of powder in gas for use outside the equipment. An input tube 42 is provided to supply air flow to the device. The apparatus shown in this figure is enclosed in housing 43 which acts similar to the housing of the device shown in Figure 2. The belt 35 is desirably a seamless porous membrane similar in characteristics to the porous membrane used in the device shown in Figure 1 and will be discussed more fully hereinafter. The retaining arm in this figure is either positioned against the walls of housing 43 to prevent loss of powder and to act with the walls to retain powder in position on belt 35, or has trailing edges formed to it above and within the width of the belt to accomplish the same purpose. It is also desirable to provide a support floor 45 positioned beneath the raw powder 40 and beneath scraper blade 38 so that the belt is held in place as it passes beneath and is loaded with the powder from powder supply 40 metered by retaining arm 38.

Figure 5:
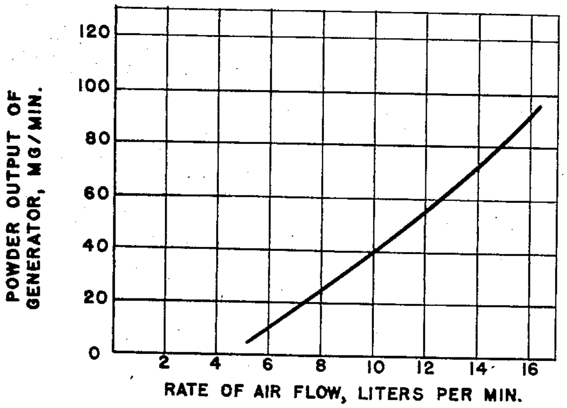
Figure 5 is a graph illustrating the effect of air flow on output of the embodiment of a cloud generator shown in Figure 2.
Figure 6:
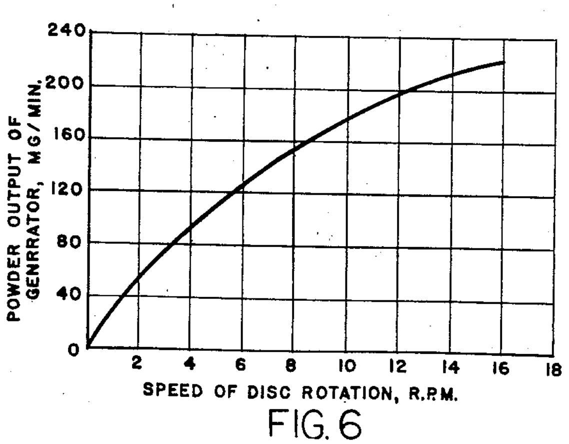
Figure 6 is a graph illustrating the effect of rotation of speed of the membrane on output using the embodiment shown in Figure 2.

In Figures 5 and 6 graphs appear. Figure 5 is included to show the effect of air flow on output of the powder cloud generator discussed and described in connection with Figure 2. Figure 6 is included to show the effect of rotation of speed of the porous membrane on the output of the embodiment of the powder cloud generator discussed and described in connection with Figure 2. These graphs will be discussed more fully below in connection with the operation of the apparatus.

As has been previously pointed out, an object of this invention is to meter controlled amounts of developer powder to a membrane and to pass this powder from the membrane in an aerosol of powder in air to create a uniformly dense and constant powder cloud output. To accomplish this objective, the porous membrane is rotated or moved in substantially a horizontal plane and a mass of developer powder is placed on the membrane in that part of its path of movement which is in a horizontal plane. The powder is prevented from rotating or moving with the disc or belt by a blade which serves both to retain the powder in position and to pass a controlled amount of powder to the membrane by scraping off excess powder as a portion of the membrane moves beneath the blade. The membrane is connected to a motor, which is preferably a variable speed drive motor so that the membrane may be rotated or moved at any desired speed. Air or gas is supplied to the device through a calibrated precision needle valve from a pressure regulated supply of air or gas.

Figure 5 shows how the output of the powder cloud generator depends upon the amount of air flowing through the membrane. The data for this figure were arrived at using a cloth disc made of cotton flannel, and the disc was rotated at two revolutions per minute. As is clear from this figure, the output of powder increases with the increase of air flow, and it is believed that with additional increases in air flow the curve would continue upward showing a greater output of powder to a point where the curve would level off. The leveling off area would indicate that all particles of developer powder are being removed from the membrane. Although this curve was made using a specific rotational speed and although a particular material was used for the disc, it is believed that the curve is representative and would appear similar in shape for different rotational speeds and different disc materials. Generally then, it may be said that the output of powder in the aerosol is dependent on air flow and will increase as air flow increases.

Figure 6 shows how the output of the generator increases as the speed of rotation of the disc is increased. The generator used in making this graph included a cloth disc as the porous membrane, the cloth disc being formed out of cotton flannel. Air was used as the gas and was flowed at a rate of 5.8 liters per minute through the generator. This graph also shows the wide variation of density in powder clouds that can be obtained by changing the speed of rotation of the disc. It is believed that this graph is representative of changing rotational speeds even though materials other than cotton flannel are used and using other air flows.

The data for Figure 5 was arrived at using what is generally known in the art as a settling chamber, which is in effect an area of increased volume into which the cloud is fed after being fed out the output tube. Such an area allows for settling of large particles or agglomerates. A settling chamber was not used in the experiments to arrive at the data for Figure 6.

The scraper blade which acts to retain powder in place and to meter powder to the membrane is positioned to contact the upper surface of the membrane materials. It is pointed out that the powder metered to the membrane is partially impregnated into it. It has been found beneficial to position the blade directly against the top surface of the membrane so that metering of powder to the disc is thereby facilitated. Spacing the retaining arm at a distance from the top surface of the membrane results in metering of particles which may be uneven in amount. The membrane itself is difficult to keep at a constant distance from the bottom edge of the retaining arm at all times during movement. Also, the particular membrane material may be uneven in thickness, adding to the difficulties of spacing the top surface of the membrane from the bottom edge of the retaining arm if spacing is attempted. Further, when a clump or agglomerate of raw powder approaches for deposition, it may be too large to pass under the retaining arm and may act to retain additional powder particles from reaching the membrane which passes beneath the retaining arm, thereby causing the metered layer to lack uniformity. These problems are avoided by positioning the retaining arm or scraper blade in direct contact with the top surface of the membrane. Advantages also seem to flow from this type of positioning in that the particles produced at the output end tend to be deagglomerated as is desirable when such particles are used for the development of images. Deagglomerated particles tend to produce fine grain and true reproductions, whereas agglomerated particles tend to produce reproductions lacking in grain quality and sometimes distorted because of agglomerate deposition or heavy deposition in some areas and fine grain deposition in other areas. The deagglomerated particles which are produced using a scraper blade or retaining arm positioned against the membrane are believed to result from the partial impregnation of the particles into the porous membrane through the working of the particles into the membrane material as the material passes beneath the arm.

A study has been made of various cloth and cloth-like materials which could be used as the material of the porous membrane. This study appears in Table I.

*Table I*

| Material | Amount of powder held, gm./sq. in. | Material | Amount of powder held, gm./sq. in. |
|---|---|---|---|
| Velveteen | 0.062 | Wool jersey | 0.013 |
| Woolen coating | 0.042 | Filter paper, Whatman No. 1 | 0.011 |
| Napped rayon lining | 0.040 | Mercerized cotton | 0.016 |
| Cotton flannel | 0.030 | Novelty weave wool | 0.007 |
| Cotton terry cloth | 0.025 | Cotton broadcloth | 0.006 |
| Miracloth | 0.015 | | |

This table summarizes the data obtained on 11 different types of material. For each material examined a number of samples were tested.

The data appearing in Table I indicates that materials having considerable nap are most effective in holding powder. Some materials can hold sufficient powder on one square inch to develop a 4 x 5 inch electrophotograph. The technique used in arriving at powder-laden samples to find the data for this table was that of tumbling powder over the cloth and scraping off the excess powder with a blade, or it may be said that the technique is similar to that used in the generator shown in Figure 2 or Figure 4. It is to be understood, of course, that the materials listed in Table I are only a sample of materials which could be used to act as the porous membrane of the powder cloud generator. Any material is intended to be encompassed within the scope of this invention which is capable of accepting powder as it moves beneath the powder supply and which is able to allow powder to move through it to the output tube. Other such materials include, but are in no way limited to, wire mesh, plastics, and the like.

Table II gives the results of a study on the effect of orifice size of the output tube on a membrane generator as shown and described in connection with Figure 2. The generator was used with an air flow rate of 5.8 liters per minute and with the disc rotating at 15 revolutions per minute. As shown by this table, the cloud concentration or cloud density is increased with an increase in the size of the orifice.

*Table II*

| Orifice diameter, inch | Number of samples | Average powder output, mg./min. |
|---|---|---|
| $1/16$ | 16 | 130 |
| $1/8$ | 16 | 280 |
| $1/4$ | 24 | 290 |
| $9/32$ | 16 | 365 |

It is further noted that the size of the output orifice is related to the threads per area of the material making up the porous membrane in creating a proper cloud. If the orifice is small as compared to the threads per area of the material, then powder will tend to puff through the output tube as batches of powder between threads arrive at the output position. The desire is to create many small quantities of powder moving through the output tube at a fast rate so that a constant continuous output of powder in air is attained. This may be accomplished by using many threads per area and a relatively large hole in the output orifice in relation to the threads per area. This relationship tends to produce a uniform density of powder in air at a uniform rate.

Another factor governing the particular material which is used relates to the wear and tear on the material as the output button presses against the cloth. A further factor in the case of using a cloth material and in some instances other materials, is the desire to avoid passage of lint through the output tube.

In this invention it has been found desirable to hold the output orifice against the porous membrane so that efficient operation is accomplished. Spacing between the output orifice and the membrane would necessitate means to control constant and uniform spacing as the disc moves above the output opening. Further, there would be considerable decrease in output density in that some of the air flowing through the housing of the powder cloud generator would avoid moving through the porous membrane and carrying out developer powder and would instead flow between the porous material and the output fitting to the output tube. It is to be understood, however, that a constant and dense output may also be achieved by positioning the output orifice firmly against the top of the porous membrane as well as against the bottom as shown in Fig. 2.

The preferred range of pressure imposed on the housing of the powder cloud generator of this invention is from 0 to 30 p. s. i. g., and the housing should be formed to withstand such pressures. It is to be understood, of course, that a housing structure may be created capable of withstanding greater pressure, and that operation of the powder cloud generator using greater pressure is intended to be encompassed by this invention.

A button-like fitting 34 surrounding the orifice of the output tube has been found desirable to allow smooth movement of the porous membrane over the output tube and to keep wear and tear of the disc to a minimum. Just about all types of solid materials have been found to work well when properly shaped into the button-like fitting and when finished smoothly. Examples of good materials for this fitting include, but are in no way limited to, glass, brass and the like.

In mounting the porous membrane for operation in the disc generator described, it is desirable to hold all areas of the membrane taut. Any means for accomplishing this purpose is intended to be encompassed within this invention.

In the preferred operation of the powder cloud generator, many figures remain quite flexible in that truly preferred operation relates to the particular use the generator is put to and the particular output desired. It may be said, however, that generally an output of above 60 mg. per minute is desired and such an output may be attained using different air flows, different speeds of rotation of the porous membrane, and the like. Examination of the tables and graphs included herein shows particular air flows, output openings, rotational speeds and the like for attaining the desired outputs.

Napped cotton flannel has been found preferred for use as the porous membrane. Although cotton flannel does not appear at the top of Table I, it has been found through usage that the output produced by cotton flannel is more constant and more uniform in density in the production of powder in air directed from the output tube of the cloud generator than those materials appearing above it in that table.

Certain features relating to the developer material are pertinent in operating the powder cloud generator and pertinent in developing electrostatic images. In general, particles should be grossly smaller than the output tube diameter, and it may be stated that finer sized particles in the absence of undue agglomeration may reveal a print or picture more pleasing to the eye than larger sized particles. Thus, a convenient particle size which results in extremely good quality copy contemplates particles having average diameters in the order of 1 micron. Yet particles in a size range of about 5 to 10 microns are substantially undetectable as fine particles with the aid of a magnifying glass and would result in high quality reproductions. From the point of view of composition of the developer particles, prints or pictures may be produced with charcoal, carbon blacks, or carbonaceous pigments. Under proper conditions, any of a number of various carbon or lamp black materials may be employed, including such material as furnace blacks, channel blacks and the like. In addition, there may be used such material as milled charcoals and similar materials, or, if desired, finely divided materials having added pigment matter. In the latter category are materials such as finely divided resins containing pigments or dyes such as carbonaceous pigments or various coloring pigments and the like, compositions of this type being preferred where the print or picture ultimately is to be made permanent by a fusing process including heat or vapor fusing.

The amount of developer particles placed behind the retaining arm or scraper blade is dependent on the amount of continuous use desired of the powder cloud generator and also on the shape and size of the retaining arm, which determines how much this arm will retain. Using a retaining arm 1½" in height and 3" in length, it is usual and proper to load the generator with from 50 to 200 gms. of raw powder particles.

Although this invention has been described in terms of a single retaining arm and a single output tube, it is to be understood and is intended to be included within the scope of this invention that more than one retaining arm may be used followed by an output tube in each instance or in connection with the embodiment shown in Figure 4, a retaining arm may be used on each side of the endless porous membrane, thereby allowing and accomplishing a denser output from the single output tube. When more than one output tube is used to carry powder in air from the porous membrane, these tubes may be combined at one point to combine their output of powder in air or they may be used individually for similar or different purposes.

Although the embodiment shown in Figure 2 has been described as a moving disc or structure beneath a stationary powder supply held in place by a powder retaining arm and a moving disc or structure moving over a stationary output tube, it is to be realized that an aerosol of powder in air similar in all respects may also be created through the movement of the retaining arm and the powder supply with it and also the movement of the powder output orifice while holding the porous membrane stationary. The need and desire is relative movement rather than movement of any particular elements.

The uses this powder cloud generator may be put to include, but are in no way limited to, the development of electrostatic images and belt loading or impregnation. In belt loading, particles are carried to a belt of material and blown into the belt. The belt may then be used by blowing the particles impregnated into the belt out of the belt for the development of electrostatic images. Belts have their value as storage areas of developer particles for the development of electrophotographic images and also supply additional beneficial features which aid in the production of uniform and dense clouds. The use of the powder cloud generator described herein for belt loading is particularly valuable, in that for belt loading the low air pressure of the preferred embodiment of this invention is particularly valuable. It is to be understood, of course, that other valuable uses exist for powder cloud generators as described herein.

While the present invention as to its objects and advantages, as has been described herein, has been carried out in specific embodiments thereof, it is not desired to be limited thereby, but is intended to cover the invention broadly within the spirit and scope of the appended claims.

What is claimed is:

1. A powder cloud generator comprising a housing, a porous membrane in said housing, drive means to cause movement of said membrane, guide means to support and position said membrane within said housing including a path maintaining at all times at least a portion of said membrane substantially in a horizontal plane, meter means within said housing positioned along the path of movement of said membrane through which said membrane moves in substantially a horizontal plane adapted to meter a uniform amount of powder particles to said membrane as said membrane moves relative thereto and adapted to retain on said membrane against said meter means a supply of powder particles, said meter means being positioned against the top surface of said membrane, input means to supply a flow of gas into said housing, and output means positioned against the underside of said porous membrane adapted to supply an aerosol of powder particles out of said housing, the flow of gas from said input means being first to said housing interior then through said membrane and then out said output tube.

2. A powder cloud generator comprising a housing, support means within said housing, a porous membrane mounted on said support means, said support means acting to hold said membrane taut and being positioned within said housing to maintain said membrane substantially in a horizontal plane, means to rotate said membrane around its central area, meter means positioned within said housing and against the top side of said membrane adapted to meter a uniform amount of powder particles to said membrane as said membrane moves relative thereto, said meter means being adapted to retain a supply of powder particles in position on said membrane against said meter means, input means to supply a flow of gas into said housing, and output means positioned against the underside of said porous membrane, said output means being adapted to supply an aerosol of powder particles fed thereto through said membrane out of said housing, the flow of gas from said input means being first into the interior of said housing then through said membrane and then out said output means.

3. A powder cloud generator comprising a housing, support and guide means positioned within said housing, an endless seamless porous membrane positioned on said support and guide means, said support and guide means acting to hold said membrane taut, drive means connected to said support and guide means to cause movement of said membrane, said support and guide means acting to cause movement of said membrane through a path in which at all times the outer surface of a portion of said membrane is substantially in a horizontal plane while facing in an upward direction, meter means positioned within said housing against the outer surface of said membrane adapted to meter a uniform amount of powder particles to said membrane as said membrane moves relative thereto, said meter means being positioned along the path of movement of said membrane in the area through which at least a portion of said membrane is moved through substantially a horizontal plane and said meter means being adapted to retain a supply of powder particles in position on said membrane against said meter means, means to supply a flow of gas into said housing, and output means positioned against the inner surface of said membrane adapted to supply an aerosol of powder particles out of said housing, the flow of gas being first into the interior of said housing then through said membrane and then out said output means.

4. A powder cloud generator comprising an air-tight housing, an input tube adapted to supply a flow of gas into said housing, an output tube adapted to supply an aerosol of powder particles from said housing, a porous membrane positioned substantially in a horizontal plane in said housing, a retaining blade positioned in said housing extending upward from the top surface of said membrane while in contact therewith adapted to retain on said membrane against said arm a supply of powder particles, an output orifice attached to said output tube within said housing positioned within the horizontal plane of said porous membrane pressing against the underside of said membrane, and means to bring about relative movement between said porous membrane and said retaining arm and relative movement between said porous membrane and said output orifice, said movement causing areas of said membrane to first pass beneath said retaining arm and then into contact with said output orifice, the flow of gas supplied by said input tube being first to the interior of said housing then through said porous membrane and then out said output orifice and into the output tube.

5. A powder cloud generator comprising an airtight housing, a support frame positioned within said housing, a cloth membrane mounted in said support frame, said support frame acting to hold said cloth membrane taut and being positioned within said housing to maintain said membrane in a horizontal plane, a retaining arm fixedly mounted to said housing and positioned to extend upward from said membrane while in contact with the upper surface thereof, an input tube adapted to supply a flow of gas to said housing, an output tube adapted to carry a mixture of powder particles in gas out of said housing, an output orifice at the end of said output tube within said housing positioned to bear firmly against the underside of said membrane, said output orifice being fitted with a button-like fitting having a smooth surface, the flow of gas supplied by said input tube being first to the interior of said housing then through said membrane and into said output orifice and then out said output tube and a variable speed motor connected to said support frame for said membrane to cause rotation of said membrane, said retaining arm being adapted to hold in position a supply of developer powder particles on said membrane and against said arm as said membrane rotates and said arm being adapted to meter a uniform amount of particulate material to said membrane as said membrane rotates therebeneath.

6. A powder cloud generator comprising an air-tight enclosure adapted to withstand pressures of 30 p. s. i. g., a cotton flannel disc, a support frame positioned within said enclosure acting to hold said disc taut and in a horizontal plane, a retaining arm fixedly mounted to said enclosure and positioned to extend upward from said disc while in contact with the upper surface thereof and positioned to extend from the center of said disc outward to an edge and in contact thereat with said frame, an input tube adapted to supply a flow of air to said enclosure, an output tube adapted to carry a mixture of powder particles in air out of said enclosure, an output orifice at the end of said output tube within said enclosure positioned to bear firmly against the underside of said disc, the flow of air supplied by said input tube being first into said enclosure then through said disc and into said output orifice and then out said output tube, said output orifice being fitted with a button-like fitting having a smooth surface and being positioned against the disc to contact areas of the disc following movement of those areas of the disc beneath said retaining arm during rotation of said disc, and a variable speed motor connected to said support frame for said disc to cause rotation of said disc, said retaining arm being adapted to hold in position a supply of developer powder particles on said disc and against said arm as said disc rotates and adapted to meter a uniform amount of particulate material to said disc as said disc rotates therebeneath.

References Cited in the file of this patent

UNITED STATES PATENTS

| | | |
|---|---|---|
| 906,176 | Westbrook | Dec. 8, 1908 |
| 1,283,071 | Cooper | Oct. 29, 1918 |
| 1,319,377 | Cooper | Oct. 21, 1919 |
| 2,416,695 | Jessop et al. | Mar. 4, 1947 |
| 2,614,655 | Katz | Oct. 21, 1952 |
| 2,664,226 | Gobin | Dec. 29, 1953 |
| 2,684,902 | Mayo et al. | July 27, 1954 |
| 2,716,826 | Huebner | Sept. 6, 1955 |
| 2,718,987 | Kimball | Sept. 27, 1955 |
| 2,725,304 | Landrigan et al. | Nov. 29, 1955 |
| 2,756,676 | Steinhilper | July 31, 1956 |